Sept. 23, 1924.
J. H. OGDEN
1,509,171
WALKING CULTIVATOR
Filed Feb. 18, 1924    2 Sheets-Sheet 1
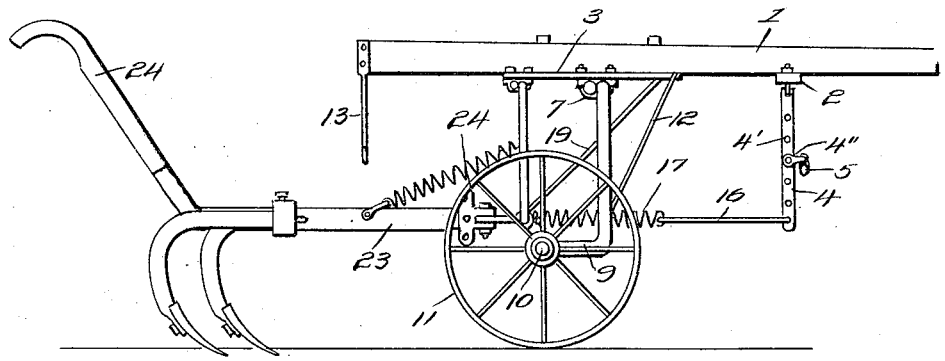
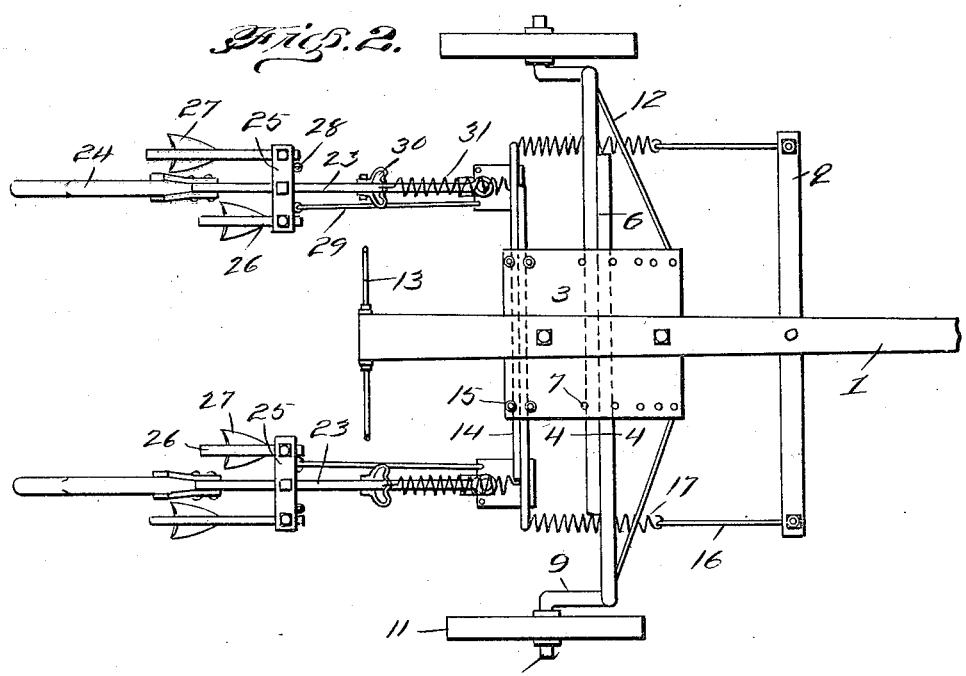
John H. Ogden.
INVENTOR.
BY
ATTORNEYS.

Sept. 23, 1924.
J. H. OGDEN
1,509,171

WALKING CULTIVATOR

Filed Feb. 18, 1924    2 Sheets-Sheet 2

John H. Ogden.
INVENTOR.

BY
ATTORNEYS.

Patented Sept. 23, 1924.

1,509,171

UNITED STATES PATENT OFFICE.

JOHN H. OGDEN, OF GRAVELLY, ARKANSAS.

WALKING CULTIVATOR.

Application filed February 18, 1924. Serial No. 693,622.

*To all whom it may concern:*

Be it known that JOHN H. OGDEN, a citizen of the United States, residing at Gravelly, in the county of Yell and State of Arkansas, has invented certain new and useful Improvements in Walking Cultivators, of which the following is a specification.

This invention relates to walking cultivators and it consists in the novel features hereinafter described and claimed.

An object of the invention is to provide a cultivator structure of the character indicated wherein the cultivator means are pivotally and adjustably connected with a wheel mounted frame, means being provided for adjusting the wheels with relation to each other and transversely of the frame in order that the cultivation may take place at opposite sides of a row of standing plants and the cultivator may function in the manner of a straddle row cultivator and the supporting wheels of the frame may be adjusted to run in the bottoms of the furrows at the opposite sides of the row irrespective of the distance between the rows of standing plants.

In the accompanying drawings:

Figure 1 is a side elevation of the walking cultivator.

Figure 2 is a top plan view of the same.

Figure 3:
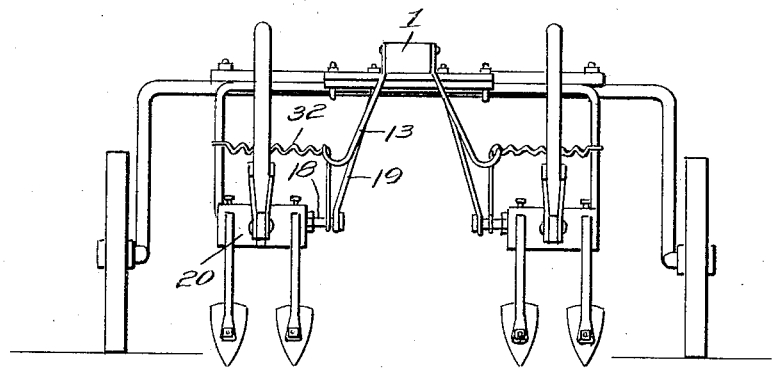
Figure 3 is a rear elevational view of the same.
Figure 4:
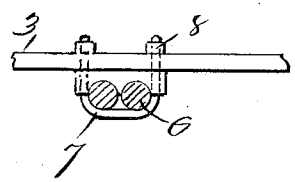
Figure 4 is a detail sectional view cut on the line 4—4 of Figure 2.
Figure 5:
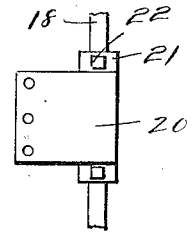
Figure 5 is a detail plan view of coupling means used upon the cultivator for connecting the cultivator beam with the frame.

The walking cultivator comprises a tongue 1 of usual pattern and to which is pivotally connected, at a point between the ends, a draft evener bar 2. A steel plate 3 is mounted upon the tongue 1 at a point behind the evener bar 2. Draft bars 4 depend from the end portions of the bar 2 and each bar 4 is provided with a series of perforations 4' with which draft clevises 4" may be connected in a usual manner. Single trees 5 are pivotally connected with the clevises 4" and to which the draft animals may be hitched in a usual manner.

A sectional arch bar structure is disposed transversely of the plate 3 and the tongue 1 and the inner end of the sections of the arch bar structure 6 overlap each other and are secured to the under side of the plate 3 by means of U-bolts 7 which straddle the sections of the arch bar structure 6 and which have end portions passing through the plate 3 and secured thereto by means of nuts 8 screwed upon the extremities of the end portions of the said U-bolts. The sections of the arch bar structure 6 are provided at their outer ends with rearwardly disposed portions 9 having at their rear ends, outwardly disposed spindles 10 upon which ground engaging wheels 11 are journalled. The portions 9 of the sections of the arch bar structure are rearwardly disposed in order that the frame of the cultivator and of which the sections of the arch bar structure are component parts may be properly balanced upon the centers of the wheels 11 and that the tongue 1 may not bear down upon the necks of the draft animals which are hitched to the cultivator frame and used for drawing the same. By loosening the nuts 8, the sections of the arch bar structure 6 are released and they may be moved longitudinally with relation to each other whereby the wheels 11 may be moved toward each other or moved away from each other in order that the said wheels may travel in the bottoms of furrows at the opposite sides of a row of standing plants and without regard to the distance or space between the adjacent rows of plants.

Brace rods 12 are connected at their outer ends with the outer portions of the sections of the arch bar structure 6, and at their inner ends the said brace rods may be adjustably connected with the plate 3 and the rods serve to brace the arch bar structure and hold the wheels 11 in parallel relation. Hooks 13 are mounted upon the rear end of the tongue 1 and are disposed at the opposite sides thereof in a usual manner.

A second, sectional, arch bar structure 14 is connected with the plate 3 at a line to the rear of the sectional arch bar structure 6 and the sections of the structure 14 overlap each other at their inner ends and are secured to the plate 3 by means of U-bolts 15. Rods 16 are pivotally connected at their forward ends with the bars 4 and springs 17 are connected with the rear ends of the rods 16 and the rear ends of the springs 17 are connected with the lower outer ends of the sections of the arch bar structure 14. Therefore when the draft animals are hitched to the trees 5 and while the cultivator is being used, the draft bar 2 may swing and the rods 16 are moved longitudinally and the springs 17 will contract and expand and compensate for the swinging movement of the draft bar 2 and distribute the pulling strain evenly to the arch bar structure 14. By loosening the U-bolts 15 the sections of the arch bar structure 14 may be adjusted longitudinally with relation to each other. Shafts 18 are carried at the lower outer portions of the sections of the arch bar structure 14 and braces 19 connect the inner portions of the shafts 18 with the plate 3. The inner ends of the shafts 18 are spaced from each other. Blocks 20 are adjustably mounted upon the shafts 18 and are held at adjusted positions by means of collars 21 which are provided with set screws 22 adapted to engage the shafts and hold the blocks against movement longitudinally of the shafts 18 but the blocks 20 are free to swing vertically between the collars 21. Cultivator beams 23 are connected at their forward ends by means of clevises 24 with the intermediate portions of the blocks 20. Each beam 23 is provided at its rear end with an upwardly and rearwardly disposed handle 24. A cross head 25 is mounted upon the median portion of each beam 23 and cultivator standards 26 are attached to the end portions of the cross heads 25 and disposed one at each side of the beam 23. The standards 26 carry at their lower rear ends, cultivator shovels or plates 27 of conventional form. Each cross head 25 is provided at its forward edge with eyes 28, the said eyes being located one at each side of the adjacent beams 23. A brace rod 29 may be connected at its rear end with either one of the eyes 28 and at its forward end with the corner portion of the adjacant block 20 and whereby the cross head 25 is braced in its adjusted position upon the attached beam 23. Clevises 30 are mounted upon the intermediate portions of the beams 23 and coil springs 31 are connected at their rear ends with the clevises 30 and at their forward ends with fluted rods 32, the outer ends of which are connected with the outer portions of the sections of the cross bar structure 14, and the inner ends of which are mounted upon the inner portions of the shafts 18. When the blocks 20 are shifted or adjusted along the shafts 18, the upper ends of the springs 31 may be moved along the fluted portions of the rods 32 and consequently the intermediate and rear portions of the beams 23 are resiliently supported from the sectional cross bar structure 14.

The cross bar structure 14 is adapted to straddle the row of standing plants when the cultivator is in operation and the beams 23 are disposed at the opposite sides of the row of standing plants. By reason of the adjusting means hereinbefore described, the beams 23 may be spread with relation to each other or moved toward each other in order that the shovels 27 may properly operate in the soil at the opposite sides of the row of standing plants and cultivate the same and without regard to the distance between the adjacent rows of standing plants.

When the cultivator arrives at the end of a row of plants and is to be turned around, one or both of the beams 23 may be raised and engaged in the hooks 13 whereby the cultivator shovels will clear the surface of the soil and the cultivator may be readily passed upon the ground engaging supporting wheels 11 and in a usual manner.

Having described the invention, what is claimed is:

1. A walking cultivator comprising a draft tongue, a draft bar pivotally mounted thereon, a plate disposed upon the tongue at a point behind the draft bar, a sectional arch bar structure adjustably connected with the plate, the sections of the arch bar structure being adjustable with relation to each other, means for fixing the sections of the arch bar structure to the plate, the sections of the arch bar structure being provided at their outer ends with rearwardly disposed portions having outwardly disposed spindles, ground engaging wheels journalled upon the spindles, braces connecting the outer portions of the sections of the arch bar structure with the plate, a sectional bar structure adjustably mounted upon the plate and located behind the first mentioned arch bar structure, means resiliently connecting the outer portion of the sections of the second mentioned arch bar structure with the outer ends of the pivoted draft bar, blocks adjustably mounted upon the sections of the second mentioned arch bar structure, cultivator beams pivotally connected with the blocks, means for bracing the beams with relation to the blocks, and means resiliently connecting the intermediate portions of the beams with the adjacent sections of the second mentioned arch bar structure.

2. A walking cultivator comprising a tongue, a draft bar pivotally mounted thereon, a plate mounted thereon at a point behind the draft bar, a sectional arch bar structure disposed transversely of the plate and the tongue, the sections of the said structure being adjustable with relation to each other and adjustable with relation to the tongue and plate, means for securing the sections of the arch bar structure at adjusted positions to the plate, the sections of the arch bar structure being provided at their outer ends with rearwardly disposed portions having outwardly disposed spindles, ground engaging wheels journalled upon the spindles, braces connecting the outer portions of the sections of the arch bar structure with the plate, a second arch bar structure composed of sections and adjustably connected with the rear portions of the plate, means resiliently connecting the outer portions of the sections of the second mentioned arch bar structure with the draft bar, blocks adjustably mounted upon the sections of the second mentioned arch bar structure, means pivotally connected with the blocks, means resiliently connecting the intermediate portions of the beams with the end portions of the adjacent sections of the second mentioned arch bar structure, cross heads carried by the beams, braces connected with the cross heads and the blocks, standards carried by the cross heads, shovels carried by the standards, and crib rods carried by the sections of the second mentioned arch bar structure, the said means for resiliently supporting the beams being adjustably connected with the said crib rods.

JOHN H. OGDEN.